Jan. 25, 1927.
C. E. MAYNARD
1,615,466
METHOD AND APPARATUS FOR FORMING BEAD WIRES
Filed April 16, 1926
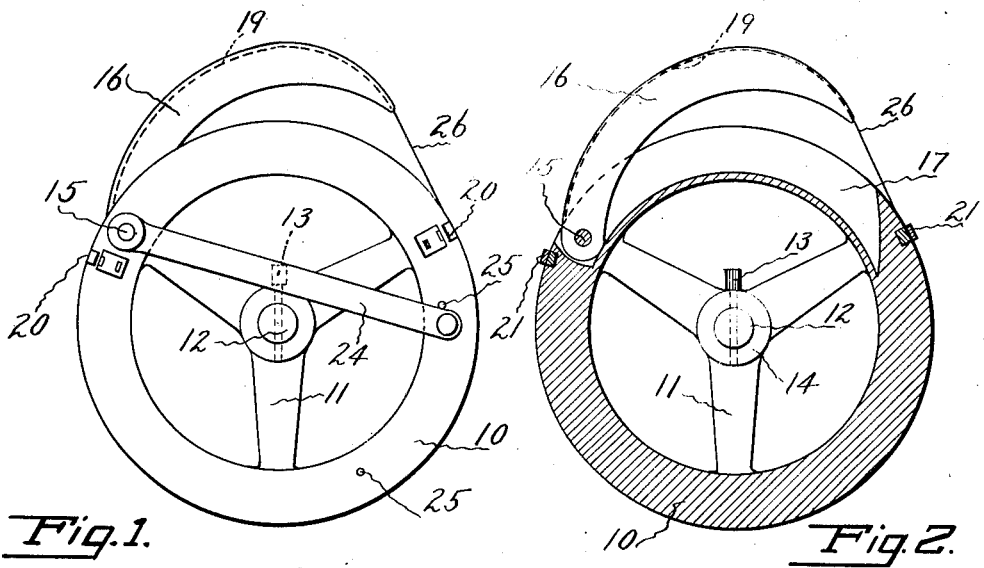
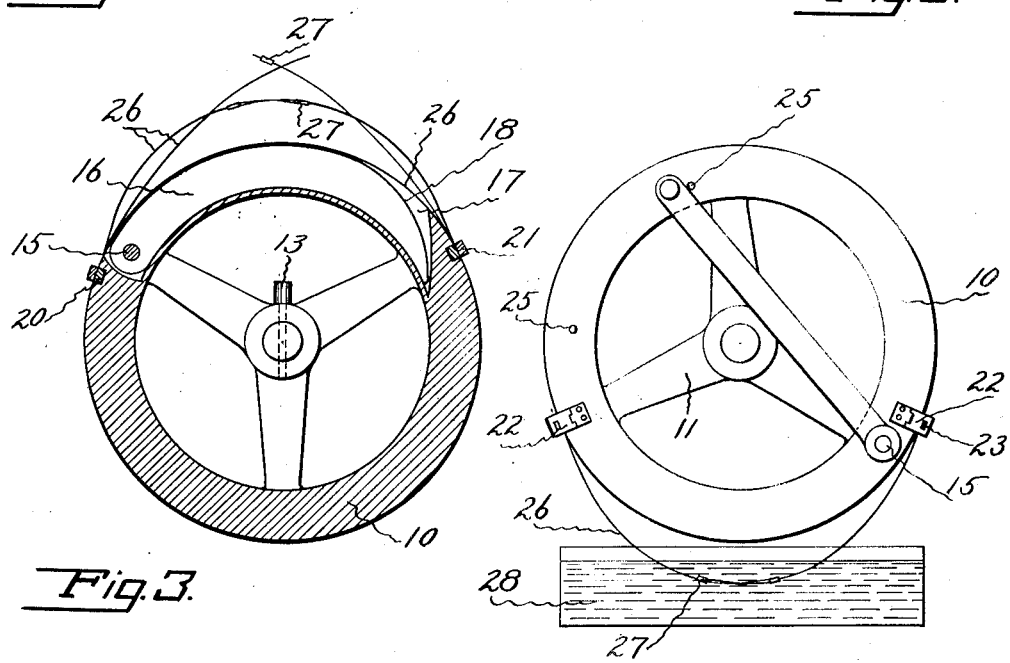
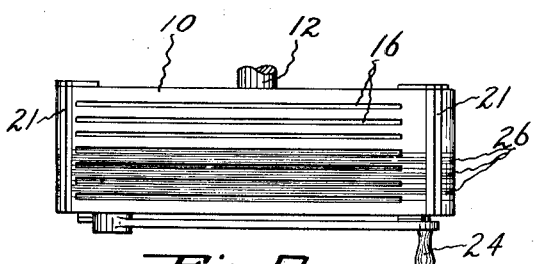
INVENTOR.
Charles Edgar Maynard
BY
Edward C. Taylor
ATTORNEY.

Patented Jan. 25, 1927.

1,615,466

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND APPARATUS FOR FORMING BEAD WIRES.

Application filed April 16, 1926. Serial No. 102,459.

This invention relates to a method and an apparatus for forming rings or grommets such as are used as reinforcements for the inextensible bead edges of tire casings. It has particular reference to the manufacture of bead wires of this type which are composed of a plurality of strands wound into the form of an annulus with the free ends of the wire joined as by solder.

The principal object of the invention is to facilitate the winding, splicing and soldering of bead wires of the type specified. One detailed object is to provide a method and an apparatus by which a large number of multistrand bead wires can be constructed at the same time without the large number of loose ends incident to their separate manufacture. Another detailed object is to provide a method and an apparatus by which the ends of a large number of bead wires can be soldered together simultaneously. Another object of the invention is to provide a method and apparatus whereby the application of solder is automatically restricted to the portions of the wire which are to be joined together without danger of the solder being applied to other portions of the annulus.

Referring to the drawings,

Fig. 1 is an end view of an apparatus with which my improved method can be practiced;

Fig. 2 is a transverse section therethrough;

Fig. 3 is a view similar to Fig. 2 showing the parts in a different operative position;

Fig. 4 is a view similar to Fig. 1 with the parts in different positions, illustrating the soldering operation; and Fig. 5 is a top plan view of the apparatus with the parts in the position of Fig. 3.

The apparatus consists in the embodiment shown of a drum 10, supported upon a suitable spider 11 from a shaft 12 so that it may be rotated. In order to hold the drum in desired working positions, a pin 13 may be arranged to fit into one or more holes through the hub 14 of the spider and through a hole in the shaft 12. Running longitudinally of the drum is a shaft 15 carrying a plurality of spaced segments 16 fitting into slots 17 in the body of the drum. The ends of the segments remote from the shaft 15 are preferably curved as at 18 on an arc of less radius than that of the drum surface, so that when the segments are projected as in Figs. 1 and 2 they will present an operative curvature somewhat sharper than the curvature of the drum itself. The outer surface of each segment carries a groove 19 adapted to receive a single strand of the wire used in making the multi-strand bead. At 20 are shown bearing members adapted to cooperate with clamping bars held against the surface of the drum by any suitable means, as for example by hinged clips 22 having holes 23 to fit over projections on the clamping bars 21. This clamping mechanism is for the purpose of holding the strands of wire in position during the cutting and soldering operations to be described. Shaft 15 is provided with a handle 24, operable to move the segments 16 to their retracted or extended positions and, when in contact with either one of stops 25, to rotate the entire drum.

The method in which the described apparatus is intended for use will now be considered. With the segments 16 in their extended position of Fig. 1, the wire 26 is now wound up on the surface of the drum with preferably a plurality of turns lying on the surface of the drum between adjacent segments and with one turn of the wire passing over each segment, as is more clearly shown in Fig. 5. The effect of this method of winding is to produce a plurality of connected coils of wire, each having several turns of the same diameter and one turn of a considerably greater diameter. During this winding operation the drum may be rotated by means of the handle 24.

After the desired amount of wire has been wound in place, the clamps 21 are applied as in Fig. 2 and the segments then moved into the retracted position of Fig. 3. The extending loops of wire are then severed and the free ends of each separate coil temporarily fastened together in some way, as by twisting them together or by the use of ferrules 27. After all of the ends have been thus joined, the drum is then rotated to bring the loops to the bottom and the twisted or ferruled splices are then dipped into a bath 28 of solder. A suitable soldering flux may be first applied by dipping in a similar manner.

The clamps 21 are now released and the several coils of wire taken off from the end of the drum. Upon removal the several turns of each coil can be equalized so that the coil will be a unit of a single diameter. This is done merely by exerting tension upon the inner periphery of the coil and takes place because there is no connection between the turns other than between the ends of the first and last turns.

It will be seen that this method produces at one time a large number of separate coils, the soldering operation being done simultaneously on all of them rather than singly on successive coils. Other forms of apparatus may of course be used, it being my intention to cover the method broadly in the appended claims without limitation to the particular form of apparatus used.

Having thus described my invention, I claim:

1. A method of making multi-strand endless coils of wire which comprises winding a coil of wire in two diameters, severing portions of the coil having the large diameter, and splicing the opposite ends of the coil.

2. A method of forming at one operation a plurality of multi-strand coils of wire which comprises winding a continuous length of wire to form a series of turns of one diameter separated by turns having portions projecting beyond the other turns, holding the wires adjacent the projecting portions, severing the projecting portions, and joining the free ends to form separate multi-strand endless coils.

3. A method of forming at one operation a plurality of multi-strand coils of wire which comprises winding a continuous length of wire to form a series of turns of one diameter separated by turns having portions projecting beyond the other turns, holding the wires adjacent the projecting portions, severing the projecting portions, temporarily joining the free ends to form multi-strand endless coils, and permanently securing said free ends together by dipping all of the projecting portions simultaneously in a bath of solder.

4. An apparatus for building multi-strand endless wire coils comprising a drum and spaced movable segments therein fitting normally into slots on the surface of the drum, and means for projecting the segments out of said slots.

CHARLES EDGAR MAYNARD.